United States Patent [19]

Ando et al.

[11] Patent Number: 4,591,574

[45] Date of Patent: May 27, 1986

[54] ALUMINA PORCELAIN COMPOSITION

[75] Inventors: Minato Ando; Masaaki Ito; Fumio Mizuno, all of Aichi, Japan

[73] Assignee: NGK Spark Plug Co., Ltd., Aichi, Japan

[21] Appl. No.: 703,959

[22] Filed: Feb. 21, 1985

[30] Foreign Application Priority Data

Feb. 21, 1984 [JP] Japan ................... 59-32113

[51] Int. Cl.$^4$ .................. C04B 35/10; C04B 35/46
[52] U.S. Cl. .......................... 501/136; 501/153
[58] Field of Search .................. 501/136, 153

[56] References Cited

U.S. PATENT DOCUMENTS 4,307,198 12/1981 Oda et al. ................. 501/136

FOREIGN PATENT DOCUMENTS 57-95872 6/1982 Japan ................... 501/136

Primary Examiner—Mark L. Bell
Attorney, Agent, or Firm—Sughrue, Mion, Zinn, Macpeak & Seas

[57] ABSTRACT

An aluminum porcelain composition, is described, of the ternary $Al_2O_3$—CaO—$TiO_2$ system, having a compositional range defined by points A, B, C, and D in the composition diagram set forth in the drawing, wherein the points A, B, C, and D represent the following molar fractions of $Al_2O_3$, CaO, and $TiO_2$:

|         | $Al_2O_3$ | CaO  | $TiO_2$ |
|---------|-----------|------|---------|
| point A | 0.94      | 0.04 | 0.02    |
| point B | 0.81      | 0.14 | 0.05    |
| point C | 0.81      | 0.02 | 0.17    |
| point D | 0.94      | 0.01 | 0.05.   |

1 Claim, 1 Drawing Figure

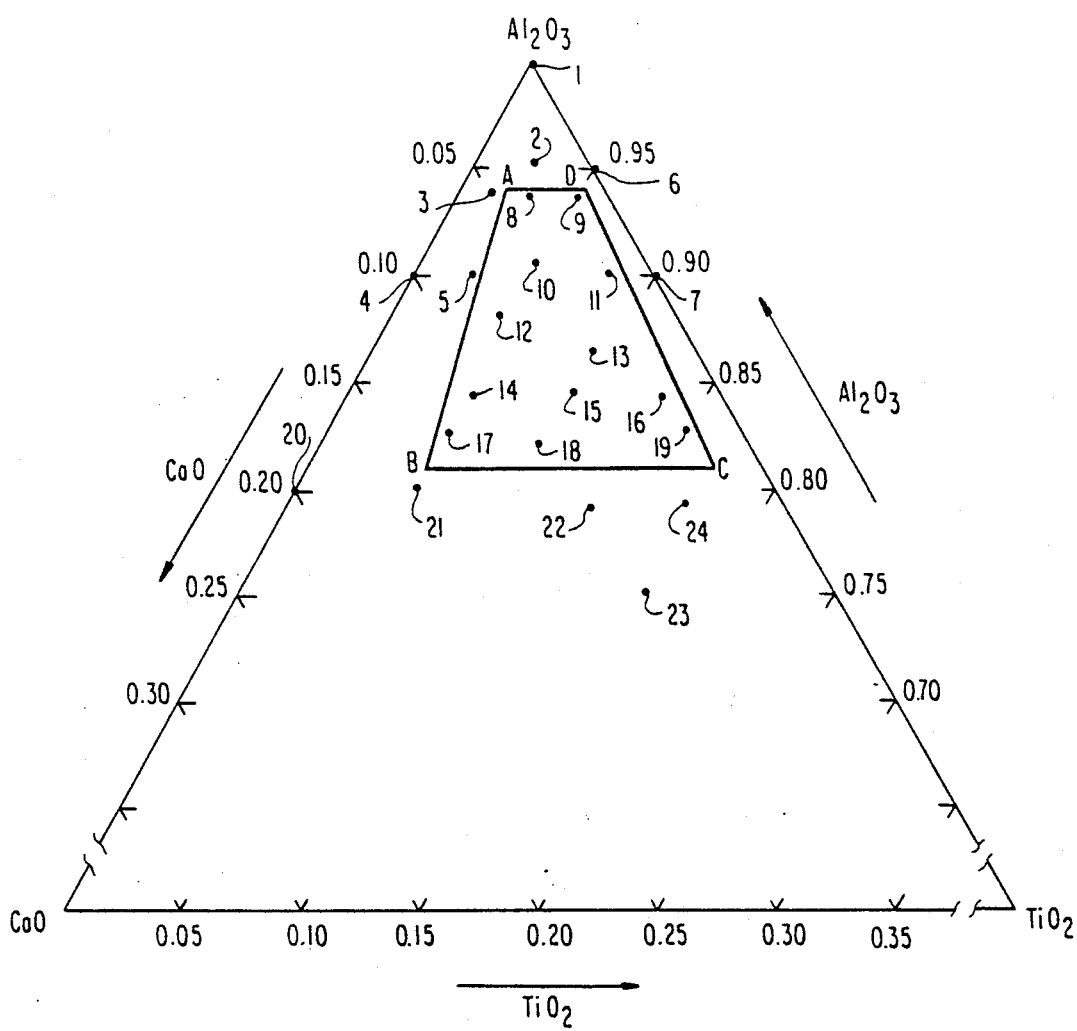

ALUMINA PORCELAIN COMPOSITION

BACKGROUND OF THE INVENTION

The present invention relates to an alumina porcelain composition suitable for use as a dielectric material having stable temperature characteristics, as well as a high dielectric constant and un-loaded Q in the high-frequency range such as the microwave frequency range, particularly at frequencies higher than those in the X-band.

The recent expansion of new media including communications networks such as satellite communications, community antenna television systems, etc., has necessitated the use of broad frequency range including high frequencies approaching the microwave frequencies due to the increased amount of communication information. The X-band has a frequency range of from 8 to 12.4 GHz and is important for satellite communications, radio communications in case of disasters, etc. At the same time, the operating range of dielectric porcelain has expanded to that of the microwave frequencies and it is used in dielectric oscillators and substrates for microwave ICs (integrated circuits), as well as for the purpose of achieving impedance matching in microwave circuits. The demand for dielectric porcelain is increasing because many units thereof are necessary for stabilizing the frequency of outputs from filters and the operating frequency of Gunn or FET microwave oscillators.

The minituarization of microwave circuits is another recent trend in the communications field. The size of a microwave circuit is limited by the wavelength of the electromagnetic waves being propagated through a waveguide containing a dielectric material. The wavelength of an electromagnetic wave propagating through a microwave circuit mounted in a waveguide is expressed as $\lambda 0/\epsilon$, wherein $\lambda 0$ is the wavelength of the microwave travelling in a vacuum and $\epsilon$ is the specific inductivity of the waveguide. This expression suggests that a smaller circuit can be realized by using a material with greater $\epsilon$. It is therefore desired to produce a dielectric porcelain composition of high dielectric constant, which displays low-loss and stable temperature characteristics.

Conventional dielectric porcelain materials include the $ZrO_2$—$SnO_2$—$TiO_2$ and $BaO$—$TiO_2$ systems, including systems having some of the foregoing atoms partially replaced by other elements, as well as the combination of a dielectric porcelain or glass having a positive temperature coefficient for specific inductivity and $TiO_2$ which has a negative temperature coefficient. However, these conventional products have one or more defects, such as low specific inductivity, a small un-loaded Q value, a temperature coefficient outside of the desired range, poor mechanical strength, poor chemical stability, and high material cost.

SUMMARY OF THE INVENTION

The present invention is based on the finding that an economical alumina porcelain composition that has sufficiently good electrical, physical, mechanical and chemical characteristics for use as a dielectric material in the high-frequency range can be obtained by combining alumina porcelain with calcium titanate having a positive temperature coefficient for resonating frequency ($\tau_f$). This alumina porcelain has a negative $\tau_f$ whose absolute value is an large as 60 ppm/°C., while at the same time, this porcelain has a high un-loaded Q and a small dielectric loss at high frequencies. Furthermore, this alumina porcelain is available at low cost and exhibits high heat conductivity, mechanical strength, and chemical stability.

Thus, the present invention provides an alumina porcelain composition of the ternary $Al_2O_3$—$CaO$—$TiO_2$ system having a compositional range defined by points A, B, C, and D in the composition diagram set forth in the drawing described hereinafter, wherein the points A, B, C, and D represent the following molar fractions of $Al_2O_3$, $CaO$, and $TiO_2$:

|         | $Al_2O_3$ | CaO  | $TiO_2$ |
|---------|-----------|------|---------|
| point A | 0.94      | 0.04 | 0.02    |
| point B | 0.81      | 0.14 | 0.05    |
| point C | 0.81      | 0.02 | 0.17    |
| point D | 0.94      | 0.01 | 0.05.   |

BRIEF DESCRIPTION OF THE DRAWING

The drawing shows a ternary composition diagram for the $Al_2O_3$—$CaO$—$TiO_2$ system, wherein the alumina porcelain composition of the present invention corresponds to the area defined by points A, B, C, and D.

DETAILED DESCRIPTION OF THE INVENTION

The criticality of the content of each component in the alumina porcelain composition of the present invention is hereunder described. If the $Al_2O_3$ content of the composition exceeds the line AD in the accompanying composition diagram, the composition has a higher Q value but its $\tau_f$ decreases to less than −33 ppm/°C. If the $Al_2O_3$ content becomes lower than the line BC, an incompletely sintered product is obtained or the Q value becomes less than 2,000, or the $\tau_f$ assumes a positive value exceeding 33 ppm/°C. If the CaO content of the composition increases and moves to the left and farther away from the line AB, the absolute value of $\tau_f$ of the composition exceeds 33 ppm/°C. The same disadvantage occurs if the $TiO_2$ content increases and moves to the right and farther away from the line CD.

Calcium titanate has a perovaskite crystal structure and exists in various compound forms such as $CaO.6TiO_2$, $CaO.2TiO_2$, $2CaO.3TiO_2$, $CaO.TiO_2$, $3CaO.2TiO_2$, $2CaO.TiO_2$ and $3CaO.TiO_2$. However, the composition of the present invention has only $CaO.TiO_2$ as a stable form.

In one preferred embodiment of the present invention, CaO and $TiO_2$ are first reacted apart from $Al_2O_3$, and the thus-obtained calcium titanate is blended with $Al_2O_3$. According to this embodiment, because the CaO and $TiO_2$ almost completely react, and do not remain in their original forms, $\tau_f$ and un-loaded Q are sufficiently improved with a smaller amount of CaO and $TiO_2$.

The present invention is illustrated in greater detail with reference to the following examle, but the present invention is not to be construed as being limited thereto.

EXAMPLE

A thousand grams of alumina (A-HPS-30 of Sumitomo Aluminum Seiren K.K.), predetermined amounts of titanium dioxide (product having a purity of 99.5%, available from Hayashi Junyaku K.K.), predetermined amounts of calcium carbonate (product having a purity of 99.6%, available from Hayashi Junyaku K.K.) and 800 ml of ethyl alcohol (product having a purity of 99.5%, available from Hayashi Junyaku K.K.) were blended so that fired products would have the molar fractions of $Al_2O_3$, CaO and $TiO_2$ shown in Table 1 and included within or excluded outside the trapezoid defined by points A, B, C and D in the accompanying composition diagram. Each blend was put into a polyethylene vessel (inner capacity: 3,000 ml) together with 3 kg of 99.9% pure alumina porcelain balls (20 mm diameter), and the charge was ground into particles by rotating the vessel at 78 rpm for 48 hours. Eighty grams of camphor was charged into the vessel and a slurry was made by mixing for 5 hours. The slurry was transferred into an aluminum bowl and allowed to dry. The dried powder was classified by passage through a 60-mesh screen. The resulting particles were pressed into compacts at a pressure of 1500 kg/cm². The compacts were sintered by holding them in the air at the temperatures shown in Table 1. The sintering temperatures selected were those which achieved the highest sintering density and the least porosity, which had been determined to be appropriate by a preliminary firing test. The sintered compacts were worked into cylinders (16.5 mm diameter × 9.5 mm length) according to the manner as described in Sessaku Kakoh Gijutsu Binran published by Nikkan Kohgyoh Shinbunsha, and Kogyohzairyoh, Vol.33, No.2 (February, 1985) published by Nikkan Kohgyoh Shinbunsha. Both ends of each cylinder were mirror-finished to a surface roughness of 0.1 s, followed by ultrasonic cleaning with Chlorothen (N-[(5-Chloro-2-thienyl)methyl]-N',N'-dimethyl-N-2-pyridinyl-1,2-ethonediamine) and pure water, each for 30 minutes. The cleaned compacts were dried in the air at 800° C. for a retention time of 1 hour, providing sample Nos. 1 to 24 of alumina porcelain composition. Sample Nos. 8 to 19 were within the scope of the present invention, and the others were not. The specific inductivity, $\tau_f$ and un-loaded Q of each sample were determined with a network analyzer system (Model 8410 C of Yokogawa-Hewlett-Packard, Ltd.) in the frequency range of 7.0 to 8.0 GHz by the dielectric cylindrical resonation method. The results are shown in Table 1.

TABLE 1

| Sample No. | Molar Fraction | | | Specific Inductibity at 7.0–8.0 GHz | $\tau_f$ (ppm/°C.) | Un-loaded Q | Sintering Temperature | Remarks |
| --- | --- | --- | --- | --- | --- | --- | --- | --- |
| | $Al_2O_3$ | CaO | $TiO_2$ | | | | | |
| 1 | 1.00 | 0 | 0 | 9.6 | −60 | 8400 | 1510 | Outside the |
| 2 | 0.950 | 0.025 | 0.025 | 10.8 | −39 | 8000 | 1440 | Present |
| 3 | 0.9375 | 0.05 | 0.0125 | 11.0 | −51 | 4000 | 1435 | Invention |
| 4 | 0.90 | 0.10 | 0 | — | — | — | Not Sintered | |
| 5 | 0.90 | 0.075 | 0.025 | 11.9 | −37.5 | 3200 | 1420 | |
| 6 | 0.95 | 0 | 0.05 | 10.1 | −43.5 | 7700 | 1435 | |
| 7 | 0.90 | 0 | 0.10 | 10.3 | −23 | 1800 | 1425 | |
| 8 | 0.9375 | 0.0325 | 0.03 | 11.8 | −31 | 7800 | 1430 | Within the |
| 9 | 0.9375 | 0.0125 | 0.05 | 11.2 | −32 | 7500 | 1430 | Scope of the |
| 10 | 0.905 | 0.0476 | 0.0476 | 12.7 | −15 | 5600 | 1425 | Present |
| 11 | 0.90 | 0.02 | 0.08 | 11.6 | −22 | 5200 | 1420 | Invention |
| 12 | 0.880 | 0.075 | 0.045 | 13.0 | −16 | 4100 | 1410 | |
| 13 | 0.864 | 0.045 | 0.091 | 14.7 | +0.5 | 4000 | 1410 | |
| 14 | 0.8425 | 0.105 | 0.0525 | 13.9 | −7.5 | 3200 | 1410 | |
| 15 | 0.8425 | 0.0638 | 0.0937 | 15.2 | +14.5 | 3800 | 1410 | |
| 16 | 0.8425 | 0.0275 | 0.13 | 12.4 | +3 | 3500 | 1410 | |
| 17 | 0.825 | 0.125 | 0.05 | 14.7 | −9 | 2700 | 1405 | |
| 18 | 0.82 | 0.09 | 0.09 | 16.3 | +31 | 2800 | 1400 | |
| 19 | 0.825 | 0.025 | 0.15 | 12.8 | +8 | 2900 | 1405 | |
| 20 | 0.80 | 0.20 | 0 | — | — | — | Not Sintered | Outside the |
| 21 | 0.80 | 0.15 | 0.05 | 15.6 | −7.5 | 1900 | 1400 | Present |
| 22 | 0.792 | 0.083 | 0.125 | 17.9 | +41.5 | 1900 | 1405 | Invention |
| 23 | 0.75 | 0.08 | 0.17 | 16.0 | +60.5 | 500 | 1405 | |
| 24 | 0.792 | 0.0417 | 0.167 | 13.0 | +28.5 | 900 | Half Sintered | |

As is clear from the results as shown in the above Table 1, the alumina porcelain composition of the present invention, produced by blending alumina with calcium carbonate and titanium dioxide so that the fired products had relative of $Al_2O_3$, CaO and $TiO_2$ which are included within the trapezid defined by points A, B, C and D in the accompanying composition diagram, and then firing the compacted blend, achieved a temperature coefficient for resonating frequency ($\tau_f$) which was about 50% or less of that of the conventional alumina porcelain, as well as achieving high level of a un-loaded Q, mainly due to an action of the resulting calcium titanate.

While the invention has been described in detail and with reference to specific embodiments thereof, it will be apparent to one skilled in the art that various changes and modifications can be made therein without departing from the spirit and scope thereof.

What is claimed is:

1. An aluminum porcelain composition of the ternary $Al_2O_3$—CaO—$TiO_2$ system having a compositional range defined by points A, B, C and D in the composition diagram set forth in the drawing, wherein the points A, B, C, and D represent the following molar fractions of $Al_2O_3$, CaO, and $TiO_2$:

| | $Al_2O_3$ | CaO | $TiO_2$ |
| --- | --- | --- | --- |
| point A | 0.94 | 0.04 | 0.02 |
| point B | 0.81 | 0.14 | 0.05 |
| point C | 0.81 | 0.02 | 0.17 |
| point D | 0.94 | 0.01 | 0.05. |

* * * * *